United States Patent [19]
Danton

[11] Patent Number: 5,461,735
[45] Date of Patent: Oct. 31, 1995

[54] BED OR COT STRUCTURE WHICH CAN BE RETRACTED INTO A CEILING

[75] Inventor: Jean-louis Danton, Boulogne, France

[73] Assignee: Establissments Compin, Paris, France

[21] Appl. No.: 265,204

[22] Filed: Jun. 24, 1994

[30] Foreign Application Priority Data

Jun. 25, 1993 [FR] France ............................ 93 07772

[51] Int. Cl.⁶ .................................................. A47C 17/38
[52] U.S. Cl. ................................................................ 5/10.2
[58] Field of Search .................... 5/10.2, 10.1; 52/364.3, 52/39; 182/77, 78, 79, 80, 81

[56] References Cited

U.S. PATENT DOCUMENTS

| | | | |
|---|---|---|---|
| 1,313,760 | 8/1919 | Teasdale | 5/10.1 |
| 2,095,392 | 10/1937 | Marschke | 182/78 |
| 2,577,914 | 12/1951 | Pfahl | 182/80 |
| 2,580,978 | 1/1952 | Triller | 182/80 |
| 3,985,202 | 10/1976 | Harmon | 182/79 |
| 4,853,989 | 8/1989 | Garcia . | |

FOREIGN PATENT DOCUMENTS

| | | |
|---|---|---|
| 0300939 | 1/1989 | European Pat. Off. . |
| 2469894 | 5/1981 | France . |
| 7415980 | 6/1976 | Netherlands . |

*Primary Examiner*—Michael J. Milano
*Attorney, Agent, or Firm*—Scully, Scott, Murphy & Presser

[57] ABSTRACT

A bed or cot structure which can be retracted into a ceiling. The bed structure is designed to fit within a recess, formed in a ceiling, which serves as a receptacle for the structure. An elongate pivoting support is rotationally coupled at one end within the recess such that it may be rotated downwardly from the recess, from a retracted to an operational position. The bed or cot is rotationally coupled to the other end of the pivoting support such that it may be rotated into a horizontal and operational orientation upon rotation of the pivoting support into its operational position. The structure is further designed to include both a controlling device which provides for easier manual control of the deployment and retraction of the bed between the recess and its operational position, and a locking device for locking the bed into a desired position.

3 Claims, 2 Drawing Sheets

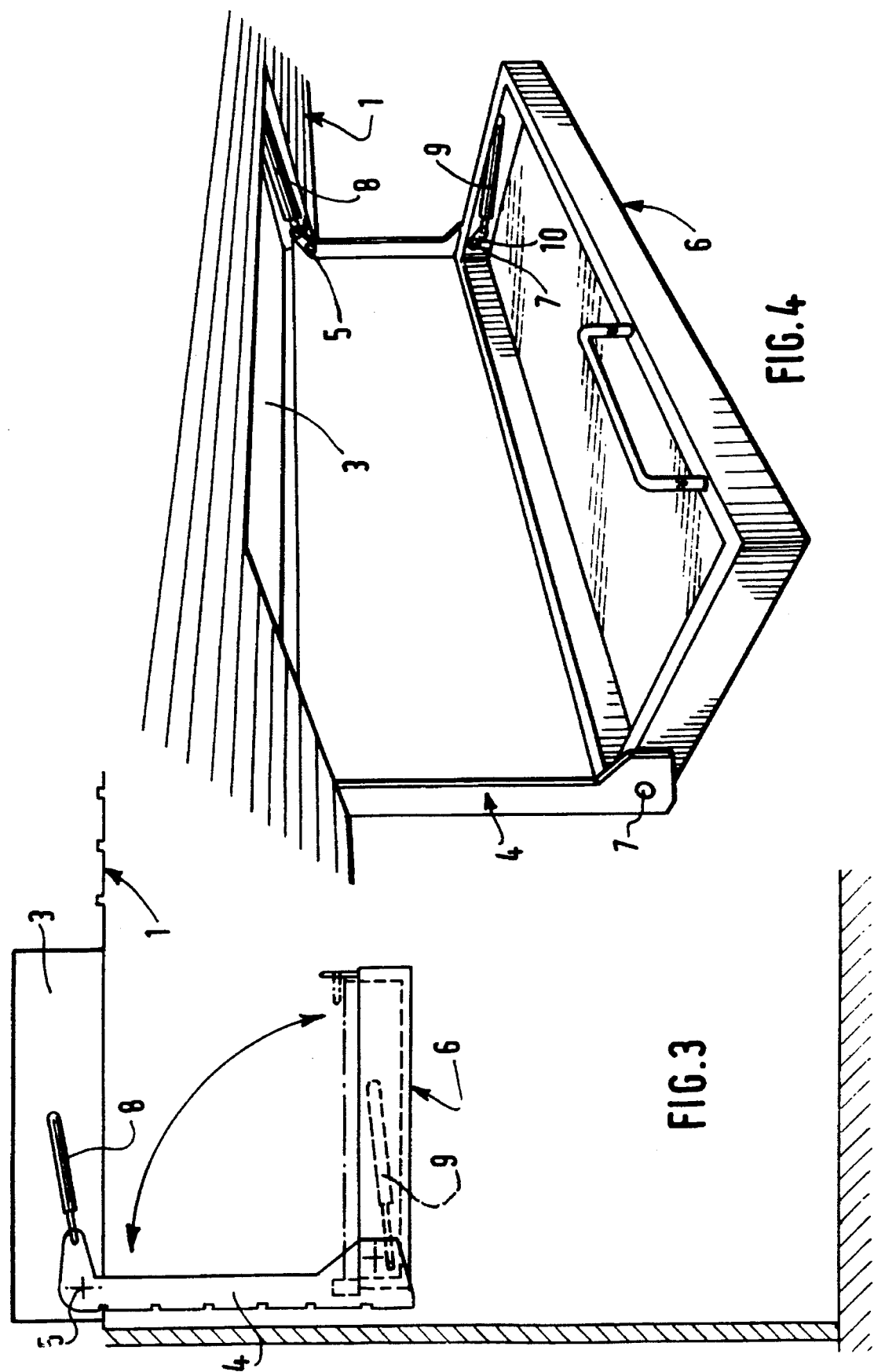

5,461,735

BED OR COT STRUCTURE WHICH CAN BE RETRACTED INTO A CEILING

BACKGROUND OF THE INVENTION

1. Field of the Invention

The subject of the present invention is a bed or cot structure which can be retracted into a ceiling.

2. Description of the Prior Art

It is known that use is frequently made of retractable bed or cot structures in small-size rooms, for example in railroad cars, in ships' cabins and in hotel rooms.

In fact, in premises of this type, the bed or the cot is generally used only as a supplementary item and thus normally has to occupy a limited volume and is not brought into its position of use until the moment it is employed.

Various types of tilting beds have been proposed to this end. Thus, the Applicant has described in FR-A- 2 469 894, a tilting bed composed of two articulated parallel lateral elements each comprising, on the one hand, a support piece intended to be fastened on a fixed structure such as a wall and, on the other hand, a tilting structure articulated on the said support piece, these two lateral elements being secured by a planar structure, such as a plywood panel, which constitutes the base of the bed.

The present invention aims to meet the same requirements but by using a bed or cot structure which can be retracted into a ceiling.

The object of the invention is also to propose such a structure which, in the retracted position, does not spoil the decor of the room and merges with that of the ceiling.

Finally, the object of the invention is to propose a structure of this type including a simple control mechanism which is easy to actuate, which makes it possible to reduce manufacturing costs and expenses involved in maintenance and use.

SUMMARY OF THE INVENTION

To this end, the subject of the invention is a bed or cot structure which can be retracted into a ceiling, characterized in that it comprises:

in the ceiling, a recess which is open downwards and intended to serve as a receptacle for the movable parts of the structure;

articulated on the inner walls of this recess, via at least one axis parallel to the ceiling, a part forming a support for the bed or the cot, this part being capable of occupying two positions, namely a first position in which it closes, in the retracted position, the receptacle made in the ceiling, and a second position in which it projects outside this receptacle;

articulated on the part forming the support via at least one pivoting axis parallel to the axis of articulation of this part on the receptacle, a bed or cot frame, this frame being capable of occupying two positions, namely a first position in which it is pressed against the part forming the support, and a second position in which it is in a position of use of the bed or the cot, parallel to the ceiling;

means for controlling the part forming the support and the bed or cot frame, these means being capable of displacing them from their first respective position to their second position, and vice versa;

and means for locking the part forming the support and the bed or cot frame in each of their respective positions.

The means for controlling the part forming the support may comprise, in a simple manner, at least one ram housed in the receptacle in the ceiling and driving a part of the support which is offset with respect to its axis of rotation or a member rigidly secured to this part forming the support.

Analogously, the means for controlling the frame of the bed or cot may comprise at least one ram carried by this frame and driving a part of the latter which is offset with respect to its pivoting axis or a member rigidly secured to this frame.

Advantageously, the face of the part forming the support which is visible from the outside in the retracted position of the structure will include the same decor as the ceiling and will be located in the same plane as the latter, avoiding any discontinuity, so as not to adversely affect the decoration of the room and to reinforce the impression of retraction of the structure.

In the position of use, the bed or cot frame will normally be arranged horizontally and contiguous with a vertical partition of the room. To this end, the axes of rotation of the part forming the support and of the bed or cot frame will be parallel to this partition.

The structure in accordance with the invention thus constitutes an assembly of great simplicity and remarkable ease of use.

BRIEF DESCRIPTION OF THE DRAWINGS

One embodiment of this structure will now be described hereafter in greater detail, with reference to the appended diagrammatic drawings. In these drawings:

FIG. 3 is a similar view, with the bed or cot frame in the position of use;

FIG. 4 is a perspective view similar to FIG. 3.

DETAILED DESCRIPTION OF THE PREFERRED EMBODIMENT

Figure 2:
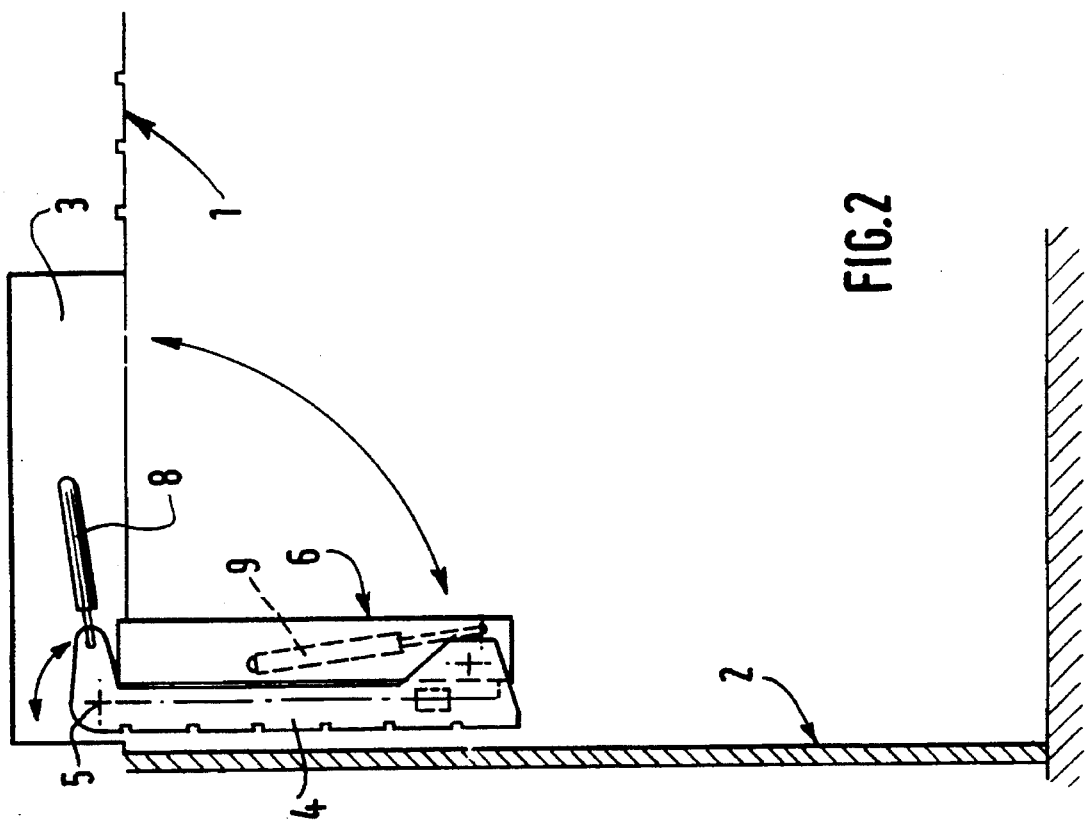
FIG. 2 is a similar view, with the structure projecting with respect to the ceiling, but with the bed or cot frame folded back against the part forming the support.

The room shown in the drawings comprises a ceiling 1 and a vertical partition 2, the intention being to place the bed or cot frame perpendicularly to this partition in the position of use.

The structure in accordance with the invention comprises, in the ceiling 1, a recess 3, contiguous with the partition 2 and intended to serve as a compartment for the movable parts of the structure in the retracted position.

These movable parts comprise a part 4 forming a support, articulated on two opposite inner walls of the compartment 3 via axes 5 which are arranged in the extension of each other and parallel to the ceiling 1 and to the partition 2.

On this part 4, at the end furthest away from the compartment 3 when this part 4 projects outside the compartment, a bed or cot frame 6 is articulated via two axes 7 which are arranged in the extension of each other and parallel to the ceiling 1 and to the partition 2.

Two rams 8 carried by two opposite inner walls of the compartment 6 [sic] each drive, via their piston, a portion of the part 4 forming the support which is offset with respect to the axes 5, so as to be able to bring this part 4 either into a first position (FIG. 1), in which it closes the lower part of the compartment 3, or into a second position (see FIGS. 2 to 4), in which it projects outside the compartment 3, parallel to the partition 2.

Analogously, two rams 9 carried by two opposite end uprights of the frame 6 each drive a link 10 (see FIG. 4) rigidly secured to the frame 6, so as to be able to bring the latter either into a first position, in which it is pressed against the part 4 (see FIG. 2), or into a second position or position of use, in which it is arranged horizontally, perpendicularly to this part 4 and to the partition 2 (see FIGS. 3 and 4).

The frame 6 is intended to receive a mattress and bedding.

Locking members, not shown on the drawings, such as locking squares, are naturally provided for locking the part 4 forming the support and the frame 6 in each of their positions.

Figure 1:
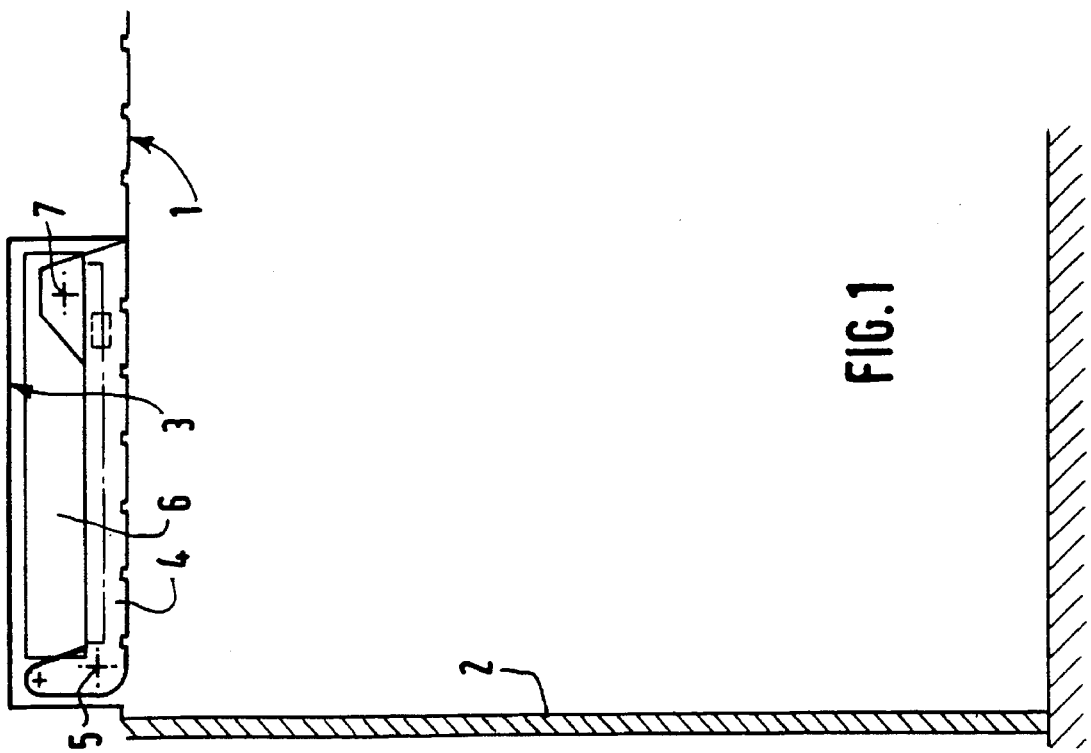
FIG. 1 is a vertical view, partially in section, of a room equipped with a structure in accordance with the invention, in the retracted position.

As may be seen in FIG. 1, the face of the part 4 which is visible from the outside in the retracted position of the structure includes the same decor as the ceiling 1 and is located in the same plane as the latter, virtually without discontinuities. The observer thus has the impression of seeing a uniform ceiling with which the bed or cot structure merges.

The extreme simplicity of this device and the ease with which it can be made to change position will be noted.

I claim:

1. A bed or cot structure which can be retracted into a recess in a ceiling, comprising:

a support, forming a support for said bed or cot, mounted at a first end thereof to at least one inner wall of said recess, said support being articulatable about a first pivot axis between a first support position and a second support position, in which first support position the support is retracted within said recess, and in which second support position the support projects outside the recess;

a frame of said bed or cot, said frame being pivotally coupled to a second end of said support such that the bed or cot may be articulated about a second pivot axis between a first frame position in which first frame position the bed is pressed against said support, and a second frame position in which said the bed or cot is in a position of use;

at least one ram for controlling the articulation of said support, said ram being capable of articulating the support between said first and second support positions, wherein a piston and a driving portion of said at least one ram are offset with respect to said first pivot axis; and means for controlling the articulation of said frame, said second means being capable of articulating the frame between said first and second frame positions.

2. A structure as set forth in claim 1, wherein said means for controlling the articulation of said frame comprises at least one ram, coupled to said frame, further wherein a piston and a driving portion of said at least one ram are offset with respect to said second pivot axis.

3. A structure as set forth in claim 1, wherein a surface of said support which is exposed to the outside of the recess when said support is in said first position, includes a surface appearance which is similar to said ceiling, and wherein said support, in said first position, is coplanar with said ceiling.

* * * * *